United States Patent [19]

Sasaki

[11] Patent Number: 4,682,497

[45] Date of Patent: Jul. 28, 1987

[54] ULTRASONIC IMAGING APPARATUS

[75] Inventor: Hiroshi Sasaki, Ootawara, Japan

[73] Assignee: Kabushiki Kaisha Toshiba, Kawasaki, Japan

[21] Appl. No.: 835,195

[22] Filed: Mar. 3, 1986

[30] Foreign Application Priority Data

Mar. 4, 1985 [JP] Japan .................................. 60-43248

[51] Int. Cl.$^4$ ............................................ G01N 29/04
[52] U.S. Cl. ........................................ 73/602; 73/628
[58] Field of Search ................. 73/602, 626, 627, 628; 128/660

[56] References Cited

U.S. PATENT DOCUMENTS 3,996,791 12/1976 Niklas et al. ........................... 73/602
4,070,905 1/1978 Kossoff ................................. 128/660

Primary Examiner—Anthony V. Ciarlante
Attorney, Agent, or Firm—Finnegan, Henderson, Farabow, Garrett & Dunner

[57] ABSTRACT

An ultrasonic imaging apparatus comprises first and second ultrasonic transducers and a driver circuit for alternately driving the first and second ultrasonic transducers to transmit ultrasonic beams in directions crossing at a given target. A receiver fetches from the echo signals of the first and second ultrasonic transducers echo components corresponding to echoes reflected in the same direction as the ultrasonic transmission direction and at a predetermined angle with respect to the target. An arithmetic logic circuit processes the echo signal components to obtain an angular dependency of scattering. A monitor displays the information representing the angular dependency of scattering.

9 Claims, 6 Drawing Figures

ULTRASONIC IMAGING APPARATUS

BACKGROUND OF THE INVENTION

This invention relates to an ultrasonic imaging apparatus of a type in which ultrasonic echo information reflecting from an object is utilized for diagnosis.

The ultrasonic imaging apparatus has widely been used in the diagnostic field. In use, it takes a tomogram of an object to be diagnosed, for example, a patient, and uses the tomogram for diagnosis. For taking a tomogram, the apparatus irradiates the patient with ultrasonic waves, receives the echo waves from a target, or an affected part, of the internal tissue of the patient, and converts them into echo signals. Subsequently, the apparatus image processes the echo signals to visualize them as a tomogram, by a monitor.

The conventional ultrasonic imaging apparatus can collect only the tomographic information of the object. By the tomographic information, it is possible to locate the affected part, but difficult to know the type and condition of the affected part. For exact diagnosis, it is essential to collect the information representing the type and conditions of the affection as well as the tomographic information.

Intensive studies on how to collect such information have been made by the inventor. In the studies, the inventor took notice of the scattered ultrasonic component in the ultrasonic wave.

The ultrasonic beams projected toward the affected part of the patient are inevitably attenuated and scattered as it travels. This is true for the echo beam from the affected part. This fact makes it very difficult to exactly detect the scattered ultrasonic component. The studies of the inventor broke through this difficulty to succeed in precise detection of the scattered ultrasonic component.

SUMMARY OF THE INVENTION

Accordingly, an object of the present invention is to provide an ultrasonic imaging apparatus which can exactly detect the scattered ultrasonic component free from the influence by the attenuation and scattering, and visually display such component.

In an ultrasonic imaging apparatus according to the present invention, at least first and second ultrasonic transducers are separately disposed on the surface of an object to be diagnosed. The first ultrasonic transducer projects ultrasonic beams toward a given target of the object at a predetermined angle with respect to the target. The echo waves coming from the target are received by both the first and second ultrasonic transducers which are disposed symmetrically with respect to an extension from the target. The echo waves as received by the first and second ultrasonic transducers are arithmetically operated to obtain an angular dependency of scattering. The angular dependent information thus obtained are displayed on the screen of a monitor.

DETAILED DESCRIPTION OF THE PREFERRED EMBODIMENTS

Figure 1:
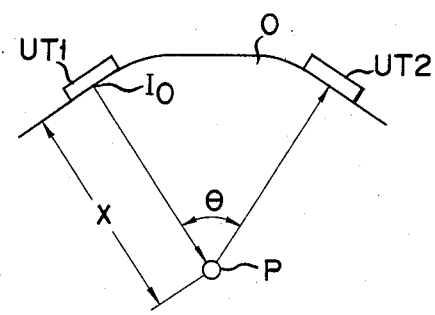
FIG. 1 shows a view showing how first and second ultrasonic transducers are disposed in relation to a target of an object to be diagnosed.

The principle of an ultrasonic imaging apparatus according to the present invention will first be given referring to FIG. 1. As shown, first and second ultrasonic transducers UT1 and UT2 are disposed in close contact with an object (internal tissue) to be diagnosed and at a predetermined angle $\theta$ with respect to a specific or target part in the object. The first ultrasonic transducer projects ultrasonic beams toward the target P, and the target reflects the ultrasonic beams. The reflected ultrasonic beams are received by both the first and second ultrasonic transducers UT1 and UT2. The transducers convert the beams into corresponding echo signals. The echo signals are fed to a frequency analyzer where the signals are frequency analyzed. The frequency spectrum of the echo signals as obtained by the frequency analysis are expressed by $$I_{TR} = I_o e^{-2\alpha x} \cdot R(x, \theta) e^{-2\alpha x} \cdot S_T(x) \cdot S_R(x) \quad (1)$$

$$I_{TT} = I_o e^{-2\alpha x} \cdot R(x, \theta) e^{-2\alpha x} \cdot S_T(x) \cdot S_R(x) \quad (2)$$

In the above expressions, $I_{TR}$ indicates the frequency spectrum of the echo signal as received by the second transducer UT2 when the first transducer UT1 transmits ultrasonic waves. $I_{TT}$ indicates the frequency spectrum of the echo signal as received by the first transducer UT1. $I_o$ indicates the intensity of ultrasonic waves emitted from the trans-ducer UT1. $e^{-2\alpha x}$ represents a damping constant of the object through which the ultrasonic beams travel. $R(x, \theta)$ represents a scattering characteristic of the object which exhibits for the ultrasonic echoes reflected at a given target of the object at an angle $\theta$, and received by the transducer UT2, when the transducer UT1 transmits ultrasonic beams. $S_T(X)$ and $S_R(X)$ represent correction constants dependent on a shape of focused beam.

By dividing the equation (1) by the equation (2) obtains the following equation (3) representing an angular dependency characteristic of the ultrasonic scattered component free from the influence by the attenuation and scattering.

$$\frac{I_{TR}}{I_{TT}} = \frac{R(x, \theta)}{R(x, 0)} = R_N(x, \theta) \quad (3)$$

Figure 2:
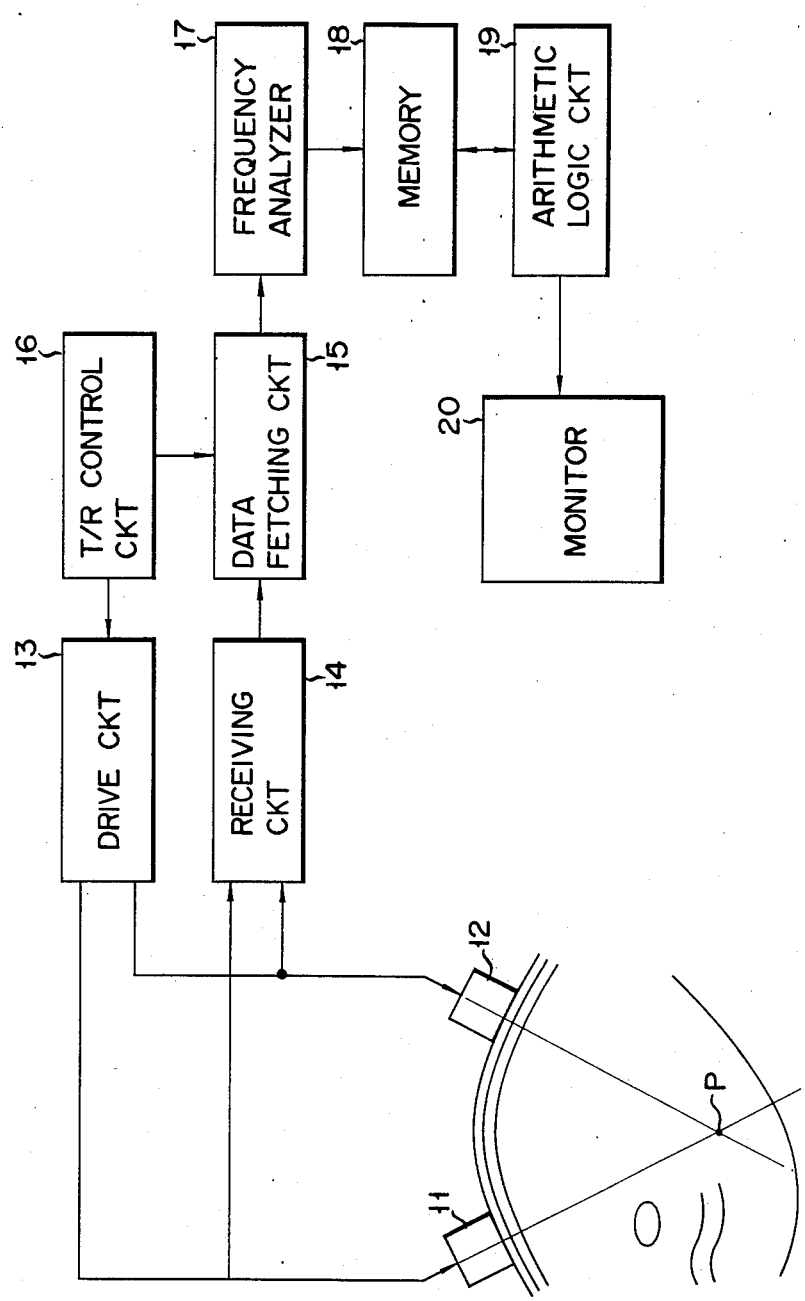
FIG. 2 is a block diagram of an ultrasonic imaging apparatus according to an embodiment of this invention.
Figure 4:
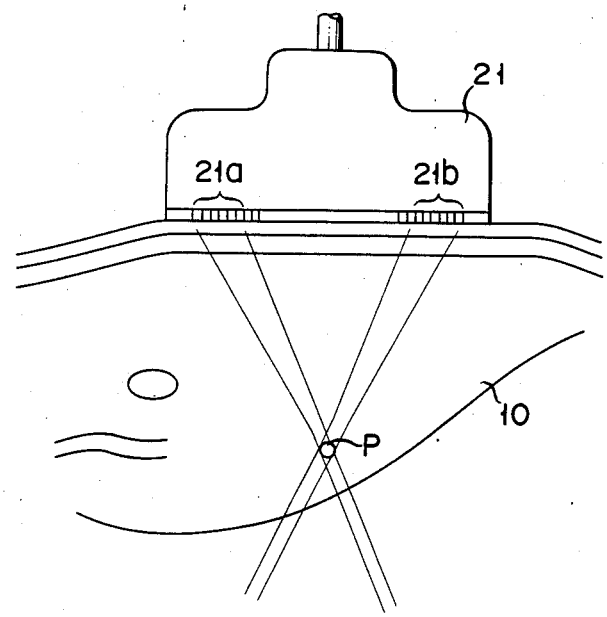
FIG. 4 shows a view illustrating a linear array probe which is set on the surface of the object with a target and used in an ultrasonic imaging apparatus according to another embodiment of the present invention.
Figure 6:
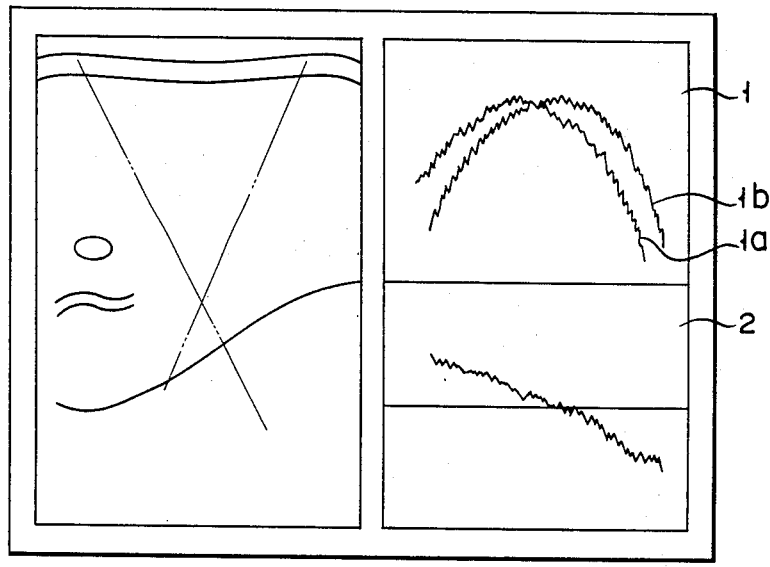
FIG. 6 shows images displayed by a monitor of the apparatus of FIG. 5.

An ultrasonic imaging apparatus to implement the above principle is shown in block form in FIG. 2. As shown, ultrasonic transducers 11 and 12 are closely set on the surface of an object 10 to be diagnosed, while being disposed with their center lines crossing at a point P. These transducers 11 and 12 are coupled with drive circuit 13 and receiving circuit 14. Circuit 14 is connected to data fetching circuit 15. Circuit 15 is arranged so as to fetch the echo components from receiving circuit 14 during a given period of time. Transmitting- /receiving control circuit 16 controls in timing the data fetch circuit 15 and drive circuit 13. Data fetch circuit 15 is further connected to frequency analyzer 17 for frequency analyzing the fetched data. Circuit 17 is connected to memory 18 which stores the results of the analysis as required. Memory 18 is connected to arithmetic/logic circuit 19 for arithmetically operating the data stored in memory 18 to obtain an angular dependency of scattering of the ultrasonic beams. Arithmetic/logic circuit 19 is coupled with monitor 20.

In operation, drive circuit 13 applies a drive pulse to transducer 11. Responsive to the drive pulse, transducer 11 projects ultrasonic pulses to a given target P in the object 10. These pulses are reflected at the target P and enter transducers 11 and 12. The reflected pulses, i.e. echo waves, are converted into echo signals by those transducers 11 and 12. The echo signals are input to data fetching circuit 15. Circuit 15 fetches only the echo signals after the lapse of a predetermined time from emission of the ultrasonic pulses by transducer 11. As a result, of the echo signals corresponding to the echo waves reflected from the object, only the echo signal components corresponding to the echo components reflected at the target P and received by transducers 11 and 12 are collected by circuit 15. The timing of this fetching operation is decided by the transmitting/receiving control circuit 16. The echo signal components are subjected to the frequency analysis and then stored into memory 18.

After the echo components based on the transmission of transducer 11 are collected, ultrasonic transducer 12 is driven by the drive pulse from drive circuit 13 to emit ultrasonic pulses to the target. The echo waves produced by the reflection of the ultrasonic pulses from transducer 12 are received by both the transducers 11 and 12. Only the echo component from the target P is fetched into data fetching circuit 15, and subjected to the frequency analysis. The echo data obtained through the frequency analysis are stored into memory 18.

In this way, ultrasonic transducers 11 and 12 alternately produce ultrasonic pulses, and the echo waves resulting from the reflection of the transmitted ultrasonic pulses are received by both the transducers 11 and 12.

The echo data obtained as described above are read out from memory 18 and input to arithmetic/logic circuit 19. Circuit 19 operates the data to obtain an angular dependency of scattering.

In the frequency analysis, the echo data is processed according to the following expressions.

$$V_{AA}(f) = V_0(f) \cdot H_{AT}(f) \cdot H_{AR}(f) \cdot Sp(f, 0) \cdot \qquad (4)$$

$$\text{EXP}\left(-\int_A^P \alpha(f)dl\right) \cdot \text{Exp}\left(-\int_P^A \alpha(f)dl\right)$$

$$V_{AB}(f) = V_0(f) \cdot H_{AT}(f) \cdot H_{BR}(f) \cdot Sp(f, \theta) \cdot \qquad (5)$$

$$\text{EXP}\left(-\int_B^P \alpha(f)dl\right) \cdot \text{Exp}\left(-\int_P^B \alpha(f)dl\right)$$

$$V_{BA}(f) = V_0(f) \cdot H_{BT}(f) \cdot H_{AR}(f) \cdot Sp(f, \theta) \cdot \qquad (6)$$

-continued $$\text{EXP}\left(-\int_B^P \alpha(f)dl\right) \cdot \text{Exp}\left(-\int_P^A \alpha(f)dl\right)$$

$$V_{BB}(f) = V_0(f) \cdot H_{BT}(f) \cdot H_{BR}(f) \cdot Sp(f, 0) \cdot \qquad (7)$$

$$\text{EXP}\left(-\int_B^P \alpha(f)dl\right) \cdot \text{Exp}\left(-\int_P^B \alpha(f)dl\right)$$

In the above expressions, $V_{AA}(f)$ and $V_{AR}(f)$ represent the frequency spectrum of the echo data received by both the transducers 11 and 12 after transducer 11 transmits ultrasonic waves to the object. $V_{BA}(f)$ and $V_{BB}(f)$ indicate the frequency spectrum of the echo data received by both the transducers 11 and 12 after transducer 12 transmits the ultrasonic waves. $V_0(f)$ is representative of the frequency spectrum of a pulse voltage which is produced by drive circuit 13 to drive transducers 11 and 12. $H_{AT}$ and $H_{BT}$ show transfer functions for the ultrasonic wave transmission by transducers 11 and 12. Sp represents an ultrasonic wave scattering characteristic at the target P of the object 10. In the equations (4) and (7), Sp indicates the scattering of ultrasonic wave in its radiation direction. In this direction, the angle between the transmission ultrasonic beam and echo ultrasonic beam is 0, and therefore the scattering characteristic is Sp(f, 0). The equations (5) and (6) are established for the angle $\theta$ between the transmission beam and echo beam. Therefore, the scattering characteristic is Sp(f, $\theta$).

If the ultrasonic transducers 11 and 12 have the same characteristics, the transfer functions of these transducers are equal to each other.

When the result of the frequency analysis is stored into memory 18, and input to arithmetic/logic circuit 19, circuit 19 multiplies $V_{AA}$ and $V_{BB}$, and $V_{AB}$ and $V_{BA}$, and calculates a ratio of these products. These operations provide an angle dependency of scattering at the target P. The mathematics expression for the operations will be given below.

$$\{V^2(f, \theta)\}/\{V^2(f, 0)\} = \{V_{AB} \times V_{BA}\}/\{V_{AA} \times V_{BB}\} \qquad (8)$$

$$= \{Sp^2(f, \theta)\}/\{Sp^2(f, 0)\}$$

Figure 3:
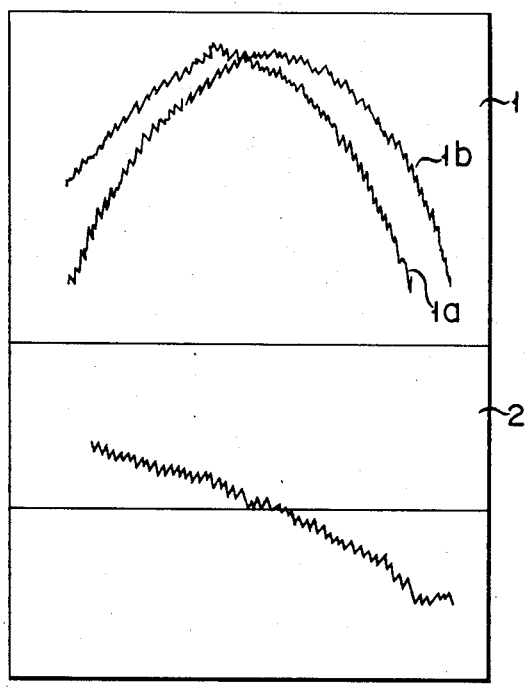
FIG. 3 shows images of the scattered ultrasonic information which are displayed on the screen of a monitor.

The signal processing according to the above equation (8) can eliminate the influence by attenuation and scattering of the ultrasonic wave in the path from the transmitting transducer to the target P in the object 10, and remove the frequency spectrum of the drive pulse. It is possible, therefore, to exactly extract the angular dependency of scattering at the target. The angular dependency information is input to monitor 20 where the information is displayed as shown in FIG. 3. In the figure, image 1a represents the scattered ultrasonic information V(f, $\theta$) obtained at angle $\theta$, and image 1b the scattered ultrasonic information V(f, 0) at angle 0. Image 2 is formed by the ratio of V(f, $\theta$) and V(f, 0). These images would assist an operator in seizing conditions of the diseased portion with many aspects.

While the above-mentioned embodiment employs a couple of ultrasonic transducers for collecting the scattered ultrasonic information, an embodiment to follow will use a linear array probe for the same purposes.

Figure 5:
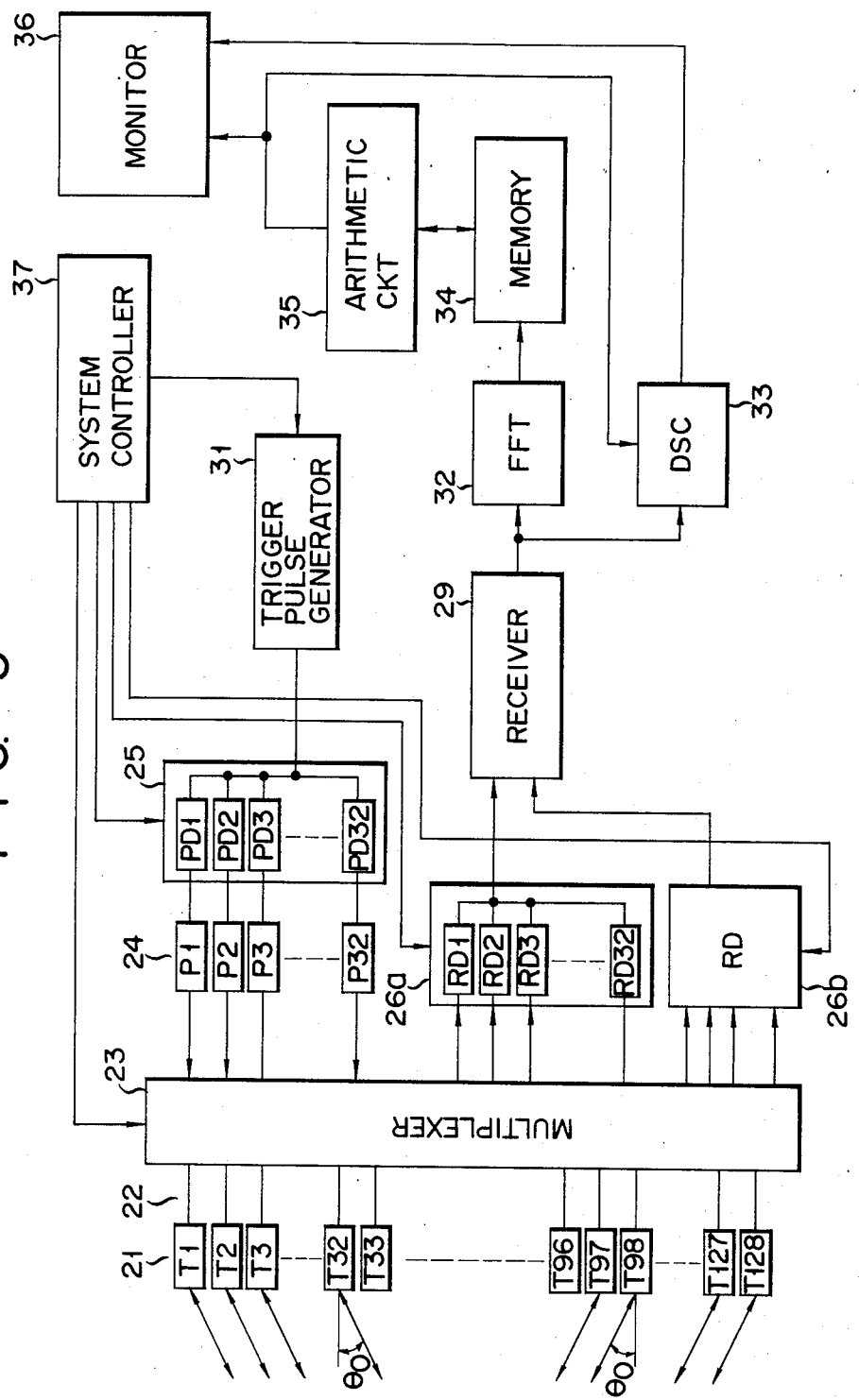
FIG. 5 is a block diagram of an ultrasonic imaging apparatus using the linear array probe of FIG. 4.

In this embodiment, linear array probe 21 is closely placed on the surface of the object 10, as shown. Under this condition, probe 21 is driven so that groups 21a and 21b of ultrasonic transducer elements located at both end portions of the probe, project ultrasonic waves in the directions crossing at a point P. Probe 21 contains 128 ultrasonic transducer elements T1 to T128 which are linearly arrayed as shown in FIG. 5. Each of the transducer elements is capable of transmitting an ultrasonic pulse when voltage is supplied to it and converting received echoes of pulse into electrical echo signals. In the preferred embodiment, these elements (T1–T128) have a width of 0.45 mm and are juxtaposed in a row at an interval d of 0.5 mm. The voltages supplied to some of the elements and electrical echo signals obtained from them are transmitted from and received by electric circuit unit 20 through cable 22. A trigger pulse generator 31 generates 3.75 MHz trigger pulses responsive of 4 KHz rate pulses provided from a system controller 37. These trigger pulses are supplied to 32 transmitting delay lines 25. These delay lines 25 produce trigger pulses of delay times to steer the ultrasonic transmitting beam along a preselected steering angle. Delay lines 25 can produce variable delay times to change the steered angle as desired. In the embodiment, however, delay lines 25 produce the trigger pulses of delay times which focus the transmitted ultrasonic beams at the given target P within the internal tissue 10 to be investigated.

When the delayed trigger pulses are supplied to 32 pulsers 24, high voltage pulses are generated from the pulsers 24 to excite the transducer elements through multiplexer 23. Output pulses of pulsers 24 are supplied to multiplexer 23 which in turn selects, for example, transducer elements T1 to T32 at the position A and connects pulsers 24 to them. Transducer elements T1 to T32 are then excited with the delayed high voltage pulses and produce the desired ultrasonic pulses. The probe 21 contacts with the surface of the object to be investigated through a coating material (not shown), and the desired ultrasonic pulses and resultant steered beam generated by the elements are transmitted into the object.

The delayed time $\tau_0$ between adjacent elements for steering the ultrasonic beam is defined by the following equation:

$$\tau_0 = (d/C_o)\sin\theta_0 \qquad (9)$$

Where $\theta_0$ is the desired transmitting angle, d is the distance between adjacent elements, and $C_o$ is the average sound velocity of normal tissue, which is approximately equal to that water, i.e. 1,530 m/s. To steer the beams at an angle $\theta_0$, the delay lines 25 are set so that each element is driven by the delayed time difference $\tau_0$. Thus, the pulse delay signals PD1=0, PD2=$\tau_0+\tau_{f2}$, PD3=$2\tau_0+\tau_{f3}$, . . . , and PD32=$31\tau_0+\tau_{f32}$ are given to the respective delay lines 25 as delayed times, where $\tau_{f2}, \tau_{f3}, \ldots$ are delay time required to focus the ultrasonic beam at a desired position. The ultrasonic pulses produced by these delayed time differences propagate along an ultrasonic transmitting beam steered at angle $\theta_0$.

After the ultrasonic pulses are sent toward the object, the multiplexer 23 selects, for example, 32 transducer elements T97 to T128 at the position B and connects them to receiving delay lines 26. Echo signals received by the elements T97 to T128 are delayed in the same manner as the transmitted signals. Thus, echo delay times of the receiving transducers are given as RD1=$31\tau_0+\tau_{f1}$, RD2=$30\tau_0+\tau_{f2}$, . . . and RD32=0. These delayed echo signals are then summed up and supplied to receiver 29. By applying the delay time, the elements T97 to T128 receive echoes at angle $\theta_0$ from given target P. Also, the multiplexer 23 selects, for example, 32 transducer elements T1 to T32 at the position A and connects them to receiving delay lines 26a. Echo signals received by the elements T1 to T32 are delayed in the same manner as the transmitted signals. Thus, echo delay times of the receiving transducers are given as RD1=$31\tau_0+\tau_{f1}$, RD2=$30\tau_0+\tau_{f2}$, . . . , and RD32=0. These delayed echo signals are then summed up and supplied to receiver 29. By applying the delay time, the elements T1 to T32 receive echoes in the same direction as that of the transmitting ultrasonic beam.

The receiver 29 amplifies and detects the summed echo signals and transmits the summed echo signals to fast Fourier transformer (FFT) 32 and DSC (digital scan converter) 33. The echo signals each are frequency-transformed by FET 32 to obtain $V_{AA}(f)$ and $V_{AB}(f)$. The frequency spectrum data $V_{AA}(f)$ and $V_{AB}(f)$ are stored into memory 34.

Again, when the delayed trigger pulses are supplied to 32 pulsers 24, high voltage pulses are generated from the pulsers 24 to excite the transducer elements through multiplexer 23. Output pulses of pulsers 24 are supplied to multiplexer 23 which in turn selects transducer elements T96 to T128 at the position B and connects pulsers 24 to them. Transducer elements T96 to T128 are then excited with the delayed high voltage pulses and produce the desired ultrasonic pulses. The desired ultrasonic pulses and resultant steered beam generated by the elements T96 to T128 are transmitted into the object.

The pulse delay signals PD1=0, PD2=$\tau_0+\tau_{f2}$, PD3=$2\tau_0+\tau_{f3}$, . . . , and PD32=$31\tau_0+\tau_{f32}$ are given to the respective delay lines 25 as delayed times. The ultrasonic pulses produced by these delayed time differences propagate along an ultrasonic transmitting beam steered at angle $\theta_0$.

After the ultrasonic pulses are sent toward the object, the multiplexer 23 selects 32 transducer elements T1 to T32 at the position A and connects them to receiving delay lines 26a. Echo signals received by the elements T1 to T32 are delayed in the same manner as the transmitted signals. Thus, echo delay times of the receiving transducers are given as RD1=$31\tau_0+\tau_{f1}$, RD2=$30\tau_0+\tau_{f2}$, . . . and RD32=0. These delayed echo signals are then summed up and supplied to receiver 29. By applying the delay time, the elements T1 to T32 receive echoes at angle $\theta_0$ from given target P. Also, the multiplexer 23 selects 32 transducer elements T97 to T128 at the position B and connects them to receiving delay lines 26. Echo signals received by the elements T97 to T128 are delayed in the same manner as the transmitted signals. Thus, echo delay times of the receiving transducers are given as RD1=$31\tau_0+\tau_{f1}$, RD2=$30\tau_0+\tau_{f2}$ . . . and RD32=0. These delayed echo signals are then summed up and supplied to receiver 29. By applying the delay time, the elements T97 to T128 receive echoes in the same direction as that of the transmitting ultrasonic beam.

The receiver 29 amplifies and defects the summed echo signals and transmits the summed echo signals to fast Fourier transformer (FFT) 32 and DSC (digital scan converter) 33. The echo signals each are frequency-transformed by FET 32 to obtain $V_{BA}(f)$ and $V_{BB}(f)$.

The frequency spectrum data $V_{BA}(f)$ and $V_{BB}(f)$ are stored into memory 34.

The echo data stored into memory 34 are input to arithmetic logic unit 35 to perform the arithmetic operation for formula (8) thereby to obtain the angular dependency of scattering. The angular dependency information is input to the monitor 36 to display the scattering information as an image.

If the system controller 37 selects a scanning mode for scanning the object 10, the multiplexer 23 selects the ultrasonic transducers T1 to T128 so that ultrasonic beam scans the object to obtain a tomographic image. That is, the group of 32 ultrasonic transducer elements is driven while the ultrasonic elements to be driven are electrically shifted one by one, for a linear scanning.

The echo signals obtained from the receiver 29 by the linear scanning are supplied to DSC 23. The echo signals are stored in its frame memory in response to the clock signal of the clock circuit 30. The echo data in DSC 23 is transferred to monitor 36 to display a tomographic image.

When the scanning mode and scattering detecting mode are alternately selected, the tomographic image 3 and the scattering information images 1 and 2 can be displayed in a real time on the monitor 36.

What is claimed is:

1. An apparatus for examining the characteristics of a target P within an object comprising:
   first and second ultrasonic transducers spaced apart by a preselected distance for converting electrical signals into ultrasonic pulses and for converting received ultrasonic echoes into electrical echo signals;
   means coupled with said first ultrasonic transducer for causing said first ultrasonic transducer to emit an ultrasonic pulse along a first beam axis toward a target P within the object;
   receiving means coupled with said first and second ultrasonic transducers for receiving a first echo signal corresponding to the ultrasonic pulse reflected from said target P along the first beam axis and a second echo signal corresponding to the ultrasonic pulse scattered at the target p and travelling along a second beam axis which intersects at a predetermined angle with the first beam axis and extends to said second transducer; and
   comparing means coupled with said receiving means for comparing the first echo signal and the second echo signal and obtaining from the comparison angular dependency characteristic of the scattering of pulses at the target P, free from the influence of attenuation and scattering along the path to and from the target P.

2. The apparatus of claim 1 wherein said comparing means includes a computer which mathematically compares the first and second echo signals.

3. The apparatus according to claim 2 wherein said comparing means includes a means for obtaining the frequency spectrums of the first echo signal and the second echo signal, and wherein the comparison means mathematically compares the resultant frequency spectrums.

4. The apparatus according to claim 1 wherein said causing means is also coupled with said second ultrasonic transducer and wherein said causing means includes a means for causing the second ultrasonic transducer to emit a second ultrasonic pulse along the second beam axis.

5. The apparatus according to claim 4 wherein said receiving means includes a means for receiving a third echo signal corresponding to the second ultrasonic pulse reflected from said target P along the second beam axis and for receiving a fourth echo signal corresponding to the second ultrasonic pulse scattered from said target P along the first beam axis.

6. The apparatus according to claim 5 wherein said comparison means compares the first, second, third and fourth echo signals.

7. An apparatus for examining the characteristics of a target P within an object comprising:
   an array of ultrasonic transducer elements for converting electrical signals into ultrasonic pulses and for converting received ultrasonic echoes into electrical echo signals, said array including first and second sub-arrays spaced apart by a preselected distance;
   driving means coupled with said transducer array for driving said first sub-array to emit an ultrasonic pulse along a first beam axis toward a target P within the object;
   receiving means coupled with said first sub-array and said second sub-array for activating said first sub-array to receive the first echo signal corresponding to the ultrasonic pulse reflected from said target along the first beam axis and for activating said second sub-array to receive a second echo signal corresponding to the ultrasonic pulse scattered from said target P and travelling along a second beam axis which intersects at a predetermined angle with the beam axis and extends to the second sub-array; and
   comparing means coupled with said receiving means for comparing the first echo signal and the second echo signal and obtaining from the echo signals the angular dependency characteristic of the scattering of pulses at the target P, free from the influence of attenuation and scattering along the path to and from the target P.

8. The apparatus of claim 7 wherein said comparing means includes a computer which mathematically compares the first and second echo signals.

9. The apparatus of claim 8 wherein said comparing means includes a means for obtaining the frequency spectrums of the first echo signal and the second echo signal, and wherein the comparison means mathematically compares the resultant frequency spectrums.

* * * * *